US005332335A

United States Patent [19]

Daul

[11] Patent Number: 5,332,335

[45] Date of Patent: Jul. 26, 1994

[54] SECONDARY CONTAINMENT SYSTEM

[75] Inventor: Charles M. Daul, Libertyville, Ill.

[73] Assignee: Amoco Corporation, Chicago, Ill.

[21] Appl. No.: 27,415

[22] Filed: Mar. 8, 1993

[51] Int. Cl.[5] ........................ B32B 35/00; B65G 5/00; E04B 1/16

[52] U.S. Cl. ........................................ 405/53; 156/98; 264/32; 264/35; 264/36; 405/128; 427/140; 588/249

[58] Field of Search .................................... 264/31-36; 427/140; 156/94, 98; 405/128, 53, 52; 588/249

[56] References Cited

U.S. PATENT DOCUMENTS

| | | | |
|---|---|---|---|
| 3,582,533 | 6/1971 | Albright | 264/35 X |
| 4,010,231 | 3/1977 | Phillips et al. | 264/36 X |
| 4,222,975 | 9/1980 | Kirschke | 264/35 |
| 4,311,409 | 1/1982 | Stang | 405/52 |
| 4,325,652 | 4/1982 | Kirschke | 405/52 X |
| 4,634,187 | 1/1987 | Huff et al. | 405/53 X |
| 4,682,911 | 7/1987 | Moreland | 405/53 X |
| 4,728,222 | 3/1988 | Wiener | 405/53 X |
| 4,778,310 | 10/1988 | Moreland | 405/53 X |
| 4,802,792 | 2/1989 | Flessas | 405/53 |
| 4,818,151 | 4/1989 | Moreland | 405/53 X |
| 4,934,866 | 6/1990 | Gage | 264/35 X |
| 4,958,957 | 9/1990 | Berg et al. | 405/53 X |
| 4,968,179 | 11/1990 | Frahm | 405/53 |
| 4,988,234 | 1/1991 | Henkel et al. | 405/52 X |
| 5,098,220 | 3/1992 | Norman | 405/53 X |

FOREIGN PATENT DOCUMENTS

| | | | |
|---|---|---|---|
| 0267013 | 5/1988 | European Pat. Off. | 264/35 |
| 2266850 | 12/1975 | France | 264/35 |
| 6515545 | 5/1967 | Netherlands | 264/35 |

*Primary Examiner*—Karen Aftergut

*Attorney, Agent, or Firm*—James R. Henes; Richard A. Kretchmer

[57] ABSTRACT

A method for fabricating a secondary containment system in place includes providing a support surface for bottom and side portions of the secondary containment systems and applying a thermoset resin material to the support surface.

3 Claims, 1 Drawing Sheet

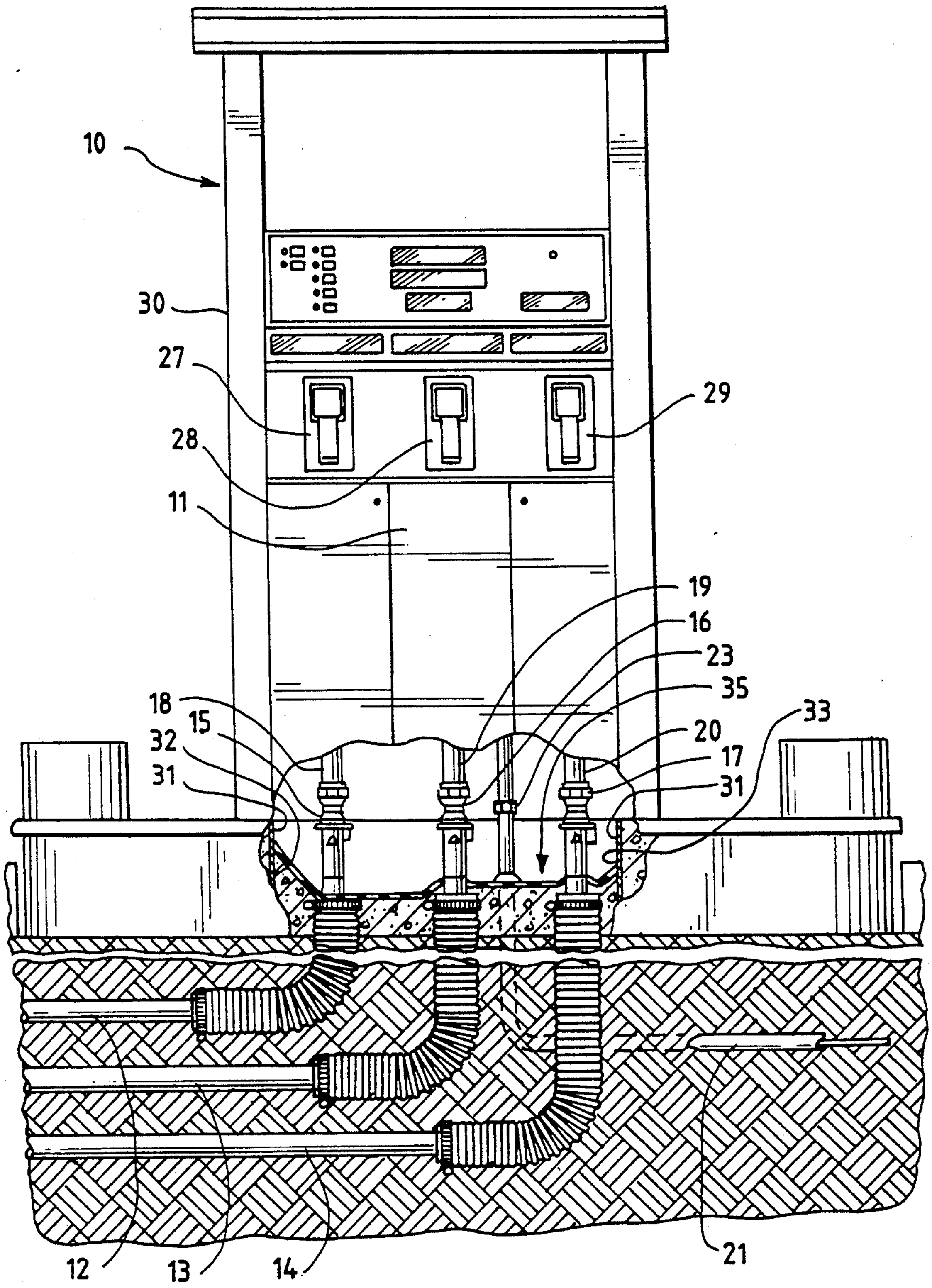
10
30
27
28
29
11
19
16
23
35
18
15
32
31
20
17
31
33
12
13
14
21

SECONDARY CONTAINMENT SYSTEM

BACKGROUND OF THE INVENTION

1. Field of the Invention

This invention relates to a method for fabricating in place a secondary containment system for hazardous liquid escaping from a primary containment system.

2. Description of the Prior Art

A secondary containment system is a system which collects and contains fluids leaking out of another and primary containment system. For example, a primary containment system may store and deliver gasoline at a corner filling station. A secondary containment system would collect and contain that same gasoline if a primary tank or delivery pipe should rupture or otherwise spill the gasoline. A secondary containment system would also catch gasoline which spills when a fill tube runs over while a fuel storage tank is being filled, for example. While the invention is described hereinafter in connection with a gasoline filling station storage and delivery system, it should be understood that the invention may also be used to protect any other suitable primary containment system.

The gasoline dispensers, or, as referred to by the general public, gasoline pumps, in a service station undergo routine maintenance on a regular basis. For example, the filters in a dispenser are typically changed once a month. When the maintenance worker removes an old filter, even though proper care has been taken, a portion of the gasoline present in the dispenser downstream of the filter may drip onto the ground beneath the dispenser. When one considers that this amount may drip from each of the dispensers in a service station on a monthly basis, it is clear that the potential pollution problem may become significant.

Gasoline drainage can also occur when less frequent types of repair work, such as changing the meters, are performed on gasoline dispensers. Therefore, gasoline drainage due to this type of repair work can also pose a significant pollution problem even though it occurs on an irregular basis. Also, dispensers can develop slow leaks at gaskets or other points despite regular maintenance. Such slow leaks allow a steady trickle of gasoline to drain onto the ground.

Accordingly, a need exists for an apparatus and a method for preventing the gasoline draining from gasoline dispensers from polluting the soil or water. It would also be highly desirable for the apparatus involved to be easy to install in existing service stations and to be compatible with existing equipment. Additionally, the method should preferably be adaptable to work with other potential sources of leaking hazardous liquids.

While commonly called "pumps", because these originally were cabinets containing individual pumps for the dispensing of gasoline, this term is now a misnomer, since generally a single separate pump is used to transfer gasoline from a storage tank to a number of gasoline dispensers. The dispenser housings themselves, thus, only contain components for feeding gasoline from a supply conduit to a dispensing hose and nozzle, and certain auxiliary equipment, such as electronic metering and pricing equipment. Gasoline dispenser housings are normally set in a place on a pump box, which is in the form of a metal frame, disposed in the ground, either flush with the surface, usually concrete, of a service station or flush with the surface of an island built in the service station area, the metal frame, open at the top and bottom with a support in the frame to hold a safety valve that is connected at one end to a fuel line, and at the other end to the dispenser. One type of metal frame, or pump box, is a generally rectangular housing, open at both the top and bottom and has four walls with flanges on two of the walls to support the box in a framework. A layer of fill material, typically coarse ground or stone is usually provided beneath the pump box, and concrete is typically poured around the box to enclose the same. Any gasoline that might spill from the dispenser conduit, in the case of a mishap, would thus drain into the fill material and then into the soil below a conventional pump box.

With the advent of more stringent environmental regulations, it is important to attempt to contain any gasoline spillage and prevent passage of such spillage to the ground, where absorption could require removal and treatment of the contaminated ground material. Hence, it is highly desirable to provide a secondary containment system for spillage from a gasoline dispenser. A number of such systems are currently available, and they include sumps, pans, bags or other devices for use under dispensers to catch spills or drips. A common characteristic of all such systems is that they are each pre-fabricated to have the shape necessary to be insertable, and to have a tight fit, under the particular dispenser with which it is to be used. In addition, all such systems must be pre-fabricated so as to have holes and closure fittings therein that are properly sized and positioned to permit the various product piping and electrical conduits associated with the particular dispenser with which it is to be used, to extend through such holes and to be liquid tight so as not to let liquids enter or escape the secondary containment system. The many different dispensers involve many different types and arrangements of product piping and electrical conduits and thus, require many different types of pre-fabricated secondary containment systems.

Thus far, no such secondary containment system is known which can be fabricated in place for all types of gasoline dispensers or for any other primary containment system and can accommodate and form a liquid-tight seal with any configuration of product piping and electrical conduits.

OBJECTS OF THE INVENTION

It is therefore a general object of the improved method for fabricating a secondary containment system which overcomes the aforesaid problems.

More specifically, it is an object of the present invention to provide an improved method for rapidly fabricating a secondary containment system in place.

It is another object of the present invention to provide an improved method for fabricating in place a secondary containment system that forms a liquid-tight seal or bond with any metallic, plastic or concrete material in contact with it.

It is a further object of the present invention to provide an improved method for fabricating in place a secondary containment system that can be employed with any primary containment system having associated with it any configuration of product piping and electrical conduits.

Other objects and advantages of the invention will become apparent upon reading the following detailed description and appended claims and upon reference to the accompanying drawings.

SUMMARY OF THE INVENTION

These objects are achieved by an improved method for fabricating in place a secondary containment system for hazardous liquid escaping from another and primary containment system, comprising: providing a support surface for the bottom and side portions of the secondary containment system, which surface is below the primary containment system; providing a thermoset resin material which, prior to being set, can be applied to a surface as a fluid and shaped, and which, when it is set, forms a substantially rigid, durable, insoluble, liquid-tight and chemical, corrosion, and decomposition-resistant monolithic solid which forms a liquid-tight seal or bond with metallic, plastic or concrete material in contact therewith and retains the shape in which it was applied; applying a monolithic layer of the aforesaid thermoset resin material to the aforesaid support surface; and allowing the aforesaid thermoset material to set to thereby form in place the aforesaid secondary containment system which comprises a substantially rigid, durable, insoluble, liquid-tight, and chemical, corrosion, and decomposition-resistant monolithic solid which forms a liquid-tight seal or bond with any metallic, plastic or concrete material in contact therewith.

BRIEF DESCRIPTION OF THE DRAWING

FIG. 1 is a front view of a gasoline dispenser with a portion of the front panel cut away.

DETAILED DESCRIPTION OF THE PREFERRED EMBODIMENTS

As will be apparent from the description hereinbelow, the attached figure and appended claims, the method of the present invention is applicable for fabricating in place a secondary containment system for hazardous liquid escaping from a wide variety of primary containment systems. For the sake of convenience, the method of this invention will be described in terms of the highly preferred embodiment thereof as a method for fabricating a secondary containment system for hazardous liquid escaping from a gasoline dispenser and the associated product piping and electrical conduits within the dispenser as the primary containment system.

Gasoline dispenser housings typically only contain components for feeding gasoline from a storage tank to supply conduits to a separate dispensing hose and nozzle for each supply conduit, and certain auxiliary equipment, such as electronic metering and pricing equipment, and a vapor return pipeline for return to a storage tank of vapors that are recovered after being released during the fueling of vehicles. A gasoline dispenser housing is normally set in place on a pump box, which is in the form of a metal frame disposed in the ground, either flush with the surface, typically concrete, of a service station or flush with the surface of an island built in the service station area, the pump box, open at the top and bottom, with a support in the pump box to hold a safety valve that is connected at one end to a fuel line and at the other end to the dispenser. A layer of coarse fill material, typically ground or stone, is provided beneath the pump box, and concrete poured around the pump box, to enclose it.

For such a gasoline dispenser, the support surface for the bottom and side portions of the secondary containment system to be fabricated by the method of this invention can be provided simply by opening or removing an access panel to the lower portion of the dispenser housing and scooping the aforesaid fill material from the desired depth, typically from a depth just below the lowest fitting in the piping and conduits within the dispenser housing, and working this fill material up to the sides of the pump box or concrete to thereby form the fill material beneath the dispenser into the shape of a bowl. The resulting surface of such fill material constitutes the support surface for the bottom and side portions of the secondary containment system to be fabricated in the method of this invention.

In addition, any other conventional suitable material can be employed in conjunction with or in place of the aforesaid fill material as the support surface for the bottom and side portions of the secondary containment system to be fabricated in the method of this invention. For example, one or more metallic, plastic, or paper sheets or foils can be placed on the fill material under the pump box, to be used alone or in conjunction with shaping of the fill material, to form the support surface for at least a portion of the bottom and side portions of the secondary containment system to be fabricated in the method of this invention. Another example of an alternative would be to add a second fill material on the surface of the aforesaid fill material that is already present under the pump box. The second fill material could then be formed into the desired shape, for example, a bowl.

Any convenient conventional thermoset resin material can be employed which, prior to being set, can be applied to a surface as a fluid and shaped, which sets within a predetermined period of time—preferably 2 hours, more preferably 1 hour, and most preferably 20 minutes—and which, when it is set, forms a substantially rigid, durable, substantially insoluble, liquid-tight, and chemical, corrosion, and decomposition-resistant monolithic solid which forms a liquid-tight seal or bond with any plastic, metallic or concrete material in contact therewith and retains the shape in which it was applied.

In this context, the term thermoset resin means a high polymer that solidifies or "sets" irreversibly when a crosslinking reaction of the molecular constituents is induced either by heating or by addition of an additive or agent. Typical thermosetting resins include allylic resins such as those based on monomers and prepolymers of diallyl phthalate and diallyl isophthalate, epoxy phenolic resins such as one-step or resole phenolics and two-step or novolac resins, unsaturated polyesters such as those based on the condensation products of maleic anhydride and a glycol and polyurethanes. Hybrid resin materials such as Xycon ®, which is manufactured by Cook Composites and Polymers, are particularly suitable for use as thermosetting resins in the method of this invention.

The thermoset resin employed is then applied in the method of this invention as a monolithic layer to the aforesaid support surface to shape the thermoset resin to the desired form for the bottom and side portions of the secondary containment system to be formed. Suitably, the thermoset resin is applied by pouring, ladling, or brushing it onto the support surface and the portions of any product piping and electrical conduits in contact with the support surface. Typically, the thermoset resin is applied to the aforesaid support surface to a thickness of about 0.125 to 0.25 inch.

The thermoset resin is then allowed to or caused to set or to finish setting, whereupon it forms a substantially rigid, durable, substantially insoluble, liquid-tight, and chemical, corrosion, and decomposition-resistant monolithic solid secondary containment system which has a liquid-tight seal or bond with any piping and electrical conduits extending through it.

The present invention will be more clearly understood from FIG. 1 and the following specific example. Shown in FIG. 1 is a front view of a gasoline dispenser 10 with a portion of the front panel 11, including a removable access panel (not shown) in it, cut away to leave open to view three fuel lines 12, 13 and 14, leading to the dispenser 10 with the safety valves 15, 16 and 17, respectively, and three fuel lines 18, 19 and 20, respectively, within the dispenser 10 and an electrical conduit 21 with the fitting 23. The fuel lines 12, 13, 14, 18, 19 and 20 deliver different grades of gasoline to the dispenser 10 which are then dispensed to the fuel tanks of automobiles through the separate nozzles 27, 28 and 29, respectively, which are shown in their position when not in use, and their respective hoses (not shown). Not shown but commonly employed is a vapor return pipeline for return to storage tanks of vapors that are recovered after being released during the fueling of vehicles. Thus, the piping and electrical conduits shown in FIG. 1 illustrate most but not all of the extensive system of piping and conduits that can and usually do extend vertically downward through the dispenser housing 30 and the pump box 31. The area beneath the pump box 31 is filled with a coarse ground or stone fill material, which, after the access panel (not shown) is removed, is scooped from a depth just below the lowest valves 15, 16 and 17 and fitting 23, and is gently worked up to the left and right sides 32 and 33 and front and back sides (not shown) of the pump box 31 to form a bowl-shaped support surface 35 for the thermoset resin.

Approximately one gallon of the liquid A component and approximately 2 gallons of the liquid B component of the two-component hybrid resin Xycon ® are mixed to form the liquid thermoset resin. The resulting liquid thermoset resin is poured or applied as a liquid onto the aforesaid support surface. The thermoset material is applied to the aforesaid support surface to a thickness of 0.125 to 0.25 inch and is allowed to set for a period of about one hour.

From the above description, it is apparent that the objects of the present invention have been achieved. While only certain embodiments have been set forth, alternative embodiments and various modifications will be apparent from the above description to those skilled in the art. These alternatives are considered equivalents and within the spirit and scope of the present invention.

Having described the invention, what is claimed is:

1. A method for fabricating in place a secondary containment system for hazardous liquid escaping from a primary containment system, comprising:

providing a support surface for bottom and side portions of the secondary containment system which support surface is below the primary containment system;

providing a thermoset resin material which, prior to being set, is applied to the support surface as a fluid and thus shaped by the support surface and which, when it is set, forms a substantially rigid, durable, insoluble, liquid-tight, and chemical, corrosion and decomposition-resistant monolithic solid layer which forms a liquid-tight seal or bond with metallic, plastic or concrete material in contact therewith and which retains the shape in which it was applied;

applying the provided thermoset resin material as a fluid to the provided support surface to form a monolithic layer of the shaped thermoset resin material on the support surface; and allowing the applied and shaped thermoset resin material to set to thereby form in place on the support surface the secondary containment system for hazardous liquid escaping from the primary containment system, which secondary containment system comprises the substantially rigid, durable, insoluble, liquid-tight, and chemical, corrosion, and decomposition-resistant monolithic solid layer which forms the liquid-tight seal or bond with metallic, plastic or concrete material in contact therewith.

2. The method of claim 1 wherein the primary containment system comprises a gasoline dispenser and associated gasoline delivery piping within the gasoline dispenser.

3. The method of claim 2 wherein the support surface is formed from fill material beneath the gasoline dispenser.

* * * * *